Nov. 7, 1950     L. G. COPEMAN     2,528,947
HAND TOOL FOR AGRICULTURAL IMPLEMENTS
Filed Aug. 15, 1947
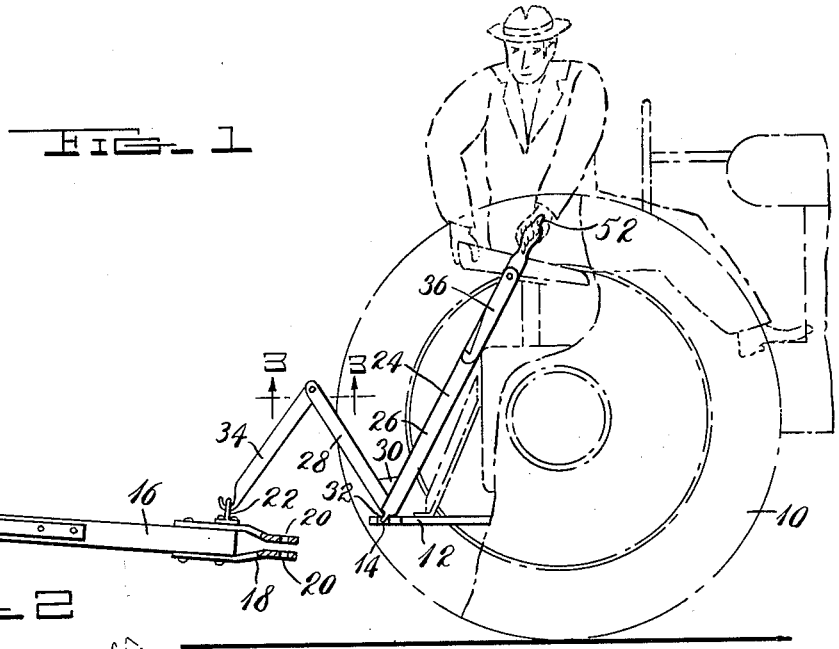
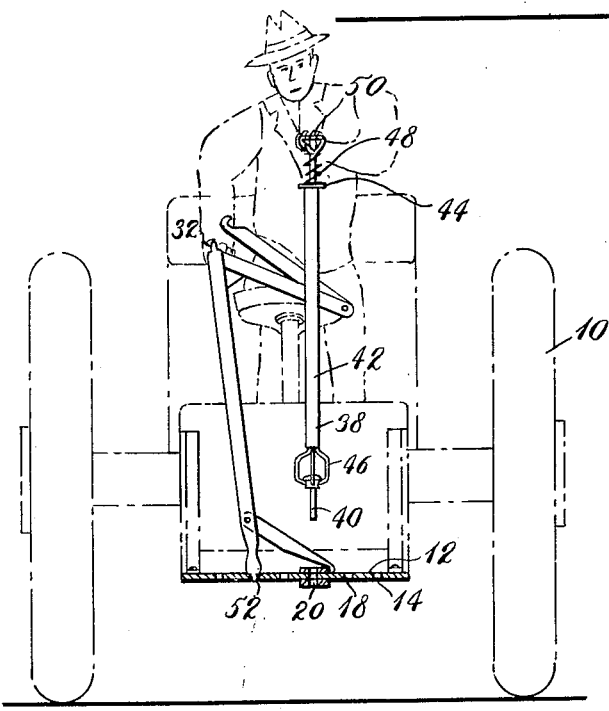
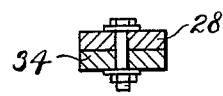
INVENTOR.
LLOYD G COPEMAN
BY
Barnes, Kisselle, Laughlin
&Raisch
ATTORNEYS Patented Nov. 7, 1950

2,528,947

UNITED STATES PATENT OFFICE 2,528,947

HAND TOOL FOR AGRICULTURAL IMPLEMENTS

Lloyd G. Copeman, Metamora, Mich., assignor to Copeman Laboratories Company, Flint, Mich., a corporation of Michigan Application August 15, 1947, Serial No. 768,794

5 Claims. (Cl. 254—113)

This invention relates to a hand tool for agricultural implements.

It is customary to provide agricultural or industrial tractors with a draw-bar having one or more holes through which a clevis pin may be inserted after the clevis or other bifurcated member of an implement tongue has been lined up in registry with the holes in the draw-bar. The use of this type of hitch entails considerable difficulty in attaching an implement to a tractor necessitating frequent stops and starts of the tractor to line up and properly position the tractor relative to the implement tongue. It is, furthermore, necessary for the operator to get down off the tractor seat one or more times in order to effect the hitch. Where the implement is heavy and is on rough ground, it is frequently impossible for the operator to move the implement at all and so the tractor must be positioned rather exactly before the clevis pin can be inserted. This usually necessitates many trial and error attempts before the tractor is properly positioned for a hitch to be effected.

It is an object of the present invention to provide a hand tool which will enable an implement tongue to be manually lifted from the ground by a tractor operator while remaining in the tractor seat. It is a further object to provide a tool which will hold the implement tongue suspended to line up in the proper horizontal plane with the draw-bar while permitting the operator to move the tractor forward or backwardly as required to properly line up the holes in the tongue and draw-bar.

The invention, furthermore, aims to provide a tool having additional means enabling the tongue to be shifted laterally on the draw-bar for aiding in lining up the tongue holes with the draw-bar holes.

Another feature of the invention relates to an improved handle device for enabling the coupling pin to be inserted by the operator without leaving his seat.

Further objects of the invention will be apparent by reference to the following description and drawings, wherein:

Figure 1 is a side view of the improved hand tool showing its use in effecting a tractor implement coupling operation.

Figure 2 is a side view of the same tool showing a second stage of its use.

Figure 3 is a cross section on the line 3—3 of Figure 1.

Referring now to the drawing, there is illustrated a tractor 10 having an arcuate draw-bar 12 located in a generally horizontal plane and provided with a plurality of coupling pin holes 14. A tongue 16 of an implement or other trailing device is provided with the usual bifurcated coupling device 18 provided with coupling pin holes 20. The tongue also is provided with a ring 22 or other means which may be engaged by a hook to lift the tongue off the ground.

The tool of the present invention comprises a generally Z-shaped assembly 24. This comprises a rigid bell-crank having a long vertical leg 26 and a shorter laterally projecting leg 28. The two are rigidly welded or otherwise secured together with a gusset 30. At the angle between the legs 26 and 28 there is provided a fulcrum pin 32 which may be engaged with any of the holes 14 with a wide range angular movement of the bell-crank assembly in either a vertical plane or a horizontal plane. In other words, the tool may rest on the draw-bar with a universal pivoting action. Pivoted to the outer end of leg 28 is a hook member 34 which is engageable with the eye 22. At its upper end the leg 26 may be provided with a cant-hook 36.

In order to easily and completely effect the coupling operation from the tractor seat, I prefer to provide a second tool 38 for holding a coupling pin 40. The tool 38 comprises a tube 42 and a flange 44 at its upper end. Inside the tube 42 is a multi-pronged grappling hook 46 which is urged upwardly by spring 48 and has a handle member 50 at its upper end. By pushing the handle 50 inwardly, the hooks 46 are opened to grasp the pin 40 and by releasing the handle the pin is engaged as shown.

In operation, the hand tool 24 is first utilized as shown in Figure 1 by inserting the hook 34 in the ring 22. Pin 32 is then inserted in one of the holes 14. The operator may then drive the tractor rearwardly while at the same time manipulating the handle 26 to lift the tongue 16 and hold it level with the draw-bar 12 so that the bifurcated portion 18 straddles the draw-bar. In so doing the operator has considerable leverage advantage by reason of the relation of links 26 and 28 and it is an easy matter to hold the tongue 16 suspended at the proper level while backing the draw-bar into the bifurcated portion. In so doing the bell-crank 24 is free to pivot in the horizontal plane if necessary. This operation will not, however, except accidentally, line up a hole 20 with one of the holes 14 and the cant-hook 36 then comes into play as follows. With the tongue resting on the draw-bar the tool is removed from the draw-bar hole and from the ring 22 and turned end for end. The operator then, using the leg 28 for a handle, inserts the end of leg 26 which is reduced in diameter as shown in 52, into one of the holes 14 and by engaging the cant-hook 36 with the tongue may easily slide the same laterally. The clevis pin may then be picked up by the tool 38 and dropped into the aligned holes in the tongue and draw-bar.

It will thus be seen that the present invention has provided a hand tool which enables heavy implement tongues to be easily held in position for backing a tractor into coupling relation without requiring the operator of the tractor to get off his seat and without requiring the assistance of a helper. This is accomplished by providing, in effect, a lifting jack for the implement tongue which may be easily operated from the tractor seat. By enabling the tool to be mounted on the tractor with a universal freedom of movement, it is possible to manipulate both the tractor and the implement tongue simultaneously in the manner required to bring them into proper engagement. While the tool may ordinarily be used as described to merely elevate the implement tongue while the tractor is being manipulated, it is also possible with a light implement to pull the implement forward and to effect a hitch without moving the tractor.

I claim:

1. A hand tool for effecting the coupling between a tractor and an implement comprising a bell-crank having a fulcrum pin insertable into a tractor draw-bar hole to support the bell-crank in a generally vertical plane with a large degree of angular freedom in the vertical plane and also in a horizontal plane, means forming a hand grip at one end of one leg of the bell-crank and a hook engageable with an implement tongue freely pivoted on the other leg of the bell-crank.

2. A hand tool for effecting the coupling between a tractor and an implement comprising a bell-crank having means engageable with a tractor to support the bell-crank in a generally vertical plane with a large degree of angular freedom in the vertical plane and also in a horizontal plane, means forming a hand grip at one end of one leg of the bell-crank and a hook engageable with an implement tongue freely pivoted on the other leg of the bell-crank.

3. A hand tool for effecting the coupling between a tractor and an implement comprising a bell-crank having a fulcrum pin insertable into a tractor draw-bar hole to support the bell-crank in a generally vertical plane with a large degree of angular freedom in the vertical plane and also in a horizontal plane, the bell-crank having a long upwardly extending leg forming a handle, the shorter leg extending laterally and having a hook pivotally suspended thereon and engageable with an implement tongue to lift the same by manipulation of the handle.

4. A hand tool for effecting the coupling between a tractor and an implement comprising a bell-crank having means engageable with a tractor to support the bell-crank in a generally vertical plane with a large degree of angular freedom in the vertical plane and also in a horizontal plane, the bell-crank having a long upwardly extending leg forming a handle, the shorter leg extending laterally and having a hook pivotally suspended thereon and engageable with an implement tongue to lift the same by manipulation of the handle.

5. A hand tool for assisting the operator of a tractor to horizontally and vertically align an apertured trailer tongue with an apertured draw bar on the tractor while remaining in the tractor seat comprising a bell-crank lever having means thereon for fulcruming said lever on said draw bar so as to permit a large degree of angular movement of said lever in both a vertical and horizontal plane, said bell-crank also having hook means thereon engageable with said tongue when said bell-crank is manually manipulated by the operator to move said tongue horizontally and vertically into alignment with said draw bar to permit a draw pin to be interengaged with said tongue and draw bar and thereby effect a coupling thereof.

LLOYD G. COPEMAN.

REFERENCES CITED

The following references are of record in the file of this patent:

UNITED STATES PATENTS

| Number | Name | Date |
|---|---|---|
| 1,997,416 | Grover | Apr. 9, 1935 |
| 2,072,391 | Varney | Mar. 2, 1937 |